United States Patent [19]
Ritchey

[11] Patent Number: 6,007,548
[45] Date of Patent: Dec. 28, 1999

[54] APPARATUS FOR AND METHOD OF INSTALLATION OF EAR TAGS

[76] Inventor: Eugene B. Ritchey, 13821 Sable Blvd., Brighton, Colo. 80601

[21] Appl. No.: 09/256,565

[22] Filed: Feb. 24, 1999

Related U.S. Application Data

[63] Continuation-in-part of application No. 08/957,180, Oct. 24, 1997.
[51] Int. Cl.⁶ ................................................. A64B 17/00
[52] U.S. Cl. .......................... 606/117; 606/116; 40/300; 40/301
[58] Field of Search ...................... 40/300, 301; 606/116, 606/117

[56] References Cited

U.S. PATENT DOCUMENTS

| | | |
|---|---|---|
| Re. 31,940 | 7/1985 | Ritchey . |
| D. 241,558 | 9/1976 | Schwindt et al. . |
| 3,552,051 | 1/1971 | Ritchey ..................................... 40/301 |
| 3,850,360 | 11/1974 | Ritchey . |
| 3,867,777 | 2/1975 | Potter ....................................... 40/301 |
| 3,900,925 | 8/1975 | La Torraca . |
| 3,916,904 | 11/1975 | Ritchey . |
| 4,000,744 | 1/1977 | Ritchey . |
| 4,195,635 | 4/1980 | Ritchey . |
| 4,281,657 | 8/1981 | Ritchey . |
| 4,368,735 | 1/1983 | Filmer . |
| 4,402,320 | 9/1983 | Filmer . |
| 4,552,147 | 11/1985 | Gardner . |
| 4,819,639 | 4/1989 | Gardner . |
| 5,228,224 | 7/1993 | Gardner ................................... 40/301 |
| 5,308,351 | 5/1994 | Nehls ....................................... 606/116 |
| 5,462,554 | 10/1995 | Gardner ................................. 606/117 |
| 5,588,575 | 12/1996 | Davignon . |
| 5,667,515 | 9/1997 | Chu ......................................... 606/116 |

FOREIGN PATENT DOCUMENTS

| | | |
|---|---|---|
| 2170320 | 8/1925 | Canada . |
| 0 004 221A3 | 10/1979 | European Pat. Off. . |
| 0002597 | of 1903 | United Kingdom .................. 606/117 |
| 2114045 | 8/1983 | United Kingdom .................. 606/117 |
| 2125343 | 3/1984 | United Kingdom . |

*Primary Examiner*—Glenn K. Dawson
*Attorney, Agent, or Firm*—Fields and Johnson, P.C.

[57] ABSTRACT

Apparatuses for and methods of installing ear tags are provided. One embodiment of the invention is defined as an ear tag installation tool and which makes use of a pair of handle members which control the insertion of an inserting member through an opening formed in the ear of an animal. The inserting member has attached to it a portion of the ear tag during the insertion process. The inserting member may be disposable and separates from the handle members after the insertion process is complete. In a second embodiment, the ear tag installation tool is an elongate tool having a handle and a distal tip for receiving the inserting member. In a third embodiment of the invention, an ear tag installer is provided which has some elements directly attached to the ear tag. The ear tag installer also includes a driving tool which forces the inserting member through the ear. In this third embodiment, the ear tag installation tools of the first and second embodiments can be used as preferred forms of the driving tool. In another embodiment of the invention, the elements of the third embodiment attached to the ear tag can be separately defined as a modified ear tag with inherent installation capability. In yet another embodiment, the distal ends of the handle members may be modified so that biasing forces are used to enhance the method of installing the ear tags.

16 Claims, 9 Drawing Sheets

Fig_5

Fig_6

Fig_7

Fig_15C

Fig_15D

Fig_16

Fig_17

Fig_18

Fig_19

Fig_20

Fig_22

Fig_21

APPARATUS FOR AND METHOD OF INSTALLATION OF EAR TAGS

This invention is a continuation-in-part application of U.S. Ser. No. 08/957,180, filed Oct. 24, 1997 and entitled "Apparatus For and Method of Installation of Ear Tags".

TECHNICAL FIELD

This invention relates to apparatuses for and methods of installing ear tags and, more particularly, to ear tag installation tools or installers which are used to attach tags to livestock animals.

BACKGROUND ART

A number of prior art devices exist which are used to install ear tags to livestock. One major consideration addressed by many of such devices is to provide an easy and efficient means by which a tag can be installed with minimal damage to the animal's ear. Another primary consideration previously addressed is to provide an ear tag that will remain securely fastened to the animal's ear and be placed in such a position that the indicia on the ear tag can be easily viewed. Yet another major consideration addressed is to provide structurally simple installation tools.

One group of prior art references disclosing ear tag applicators that address one or more of the preceding considerations are a number of U.S. patents to Gardner. Specifically, U.S. Pat. No. 4,819,639 discloses an ear tag applicator comprising two pivotally connected handle members which are moved between an open and closed position to install an ear tag. One of the members includes a pivotal bar which has an ear tag mounted thereto. The other handle member stabilizes the ear and enables the ear tag to be placed through the ear by closing the handle members. U.S. Pat. Nos. 4,552,147 and 5,462,554 also disclose tag applicators having pivotally connected handle members and a pivotal bar for mounting the ear tag. U.S. Pat. No. 5,228,224 to Gardner further discloses one example of an ear tag which may be installed by one or more of the previous Gardner patents.

U.S. Pat. No. 4,368,735 to Filmer is another example of a prior art reference disclosing two pivotal handle members and an ear piercing pin or bar member.

The foregoing inventions are suitable for their intended purposes. However, one disadvantage to many prior art references is that cross contamination between livestock can occur when the ear tool applicator touches any portion of the animal's ear which has been pierced or cut by the applicator. Such cross contamination can result in unnecessarily diseased livestock which, in turn, can result in expensive and extensive treatment. Accordingly, one objective of the invention disclosed herein is to provide a means by which an ear tag can be installed minimizing cross contamination between animals.

It is another objective to provide an ear tag tool or installer which quickly and efficiently installs ear tags.

It is yet another objective to provide the ear tag installation elements on either a separate installation tool or on structure attached to the ear tag.

It is yet another objective of this invention to provide a method of installation whereby the ear tag is efficiently secured to the animal's ear by taking advantage of a resilient or spring-like feature of a neck portion of the tag or installer and activated by a slotted inserting member.

It is yet another object of this invention to provide an ear tag installation tool which incorporates the use of handle members with resiliently biased distal ends which greatly aid in the installation of the ear tag.

If sterility is not a concern in tag installation, it also contemplated by this invention that the installation tool installer may incorporate an inserting member which remains permanently attached to the handle members.

DISCLOSURE OF THE INVENTION

In accordance with the present invention, apparatuses and methods of installing ear tags are provided. In one embodiment, a pair of pivotal handle members are used in conjunction with a disposable inserting member which is attached to a pivoting head on one of the handle members. The inserting member includes a cutting element or tip which pierces the ear. A tab portion or locking member of the ear tag is removably connected to the inserting member. The distal ends of the handle members are placed around the animal's ear and are closed upon one another causing the inserting member to be inserted through the ear along with the tab portion or locking member of the ear tag. The resilient configuration of a neck portion of the tag attached to the tab portion causes the locking member to be easily stripped away from the inserting member once the inserting member clears the ear. The inserting member then falls away from the animal's ear leaving the ear tag securely fastened to the animal's ear by the locking member.

In another embodiment, the ear tag installation tool simply comprises a handle member having a distal end for which to removably attach an inserting member. Use of the second embodiment is similar to the first embodiment in that the inserting member is inserted through the ear with the tab portion or locking member of the tag attached thereto. However, in the second embodiment, the ear of the animal is stabilized by simply grasping it with a free hand while the inserting member is inserted through the ear. The same stripping action as discussed above applies to this embodiment resulting in easy installation of the ear tag.

In another embodiment, an ear tag installer is provided which incorporates the inserting member and cutting tip directly on structure attached to the neck portion of the ear tag. Additionally, the tab portion or locking member of the ear tag used in the previous embodiments is the inserting member. The installer of this embodiment may also be defined as including the neck portion and similar structure found on either the first or second embodiment which forces the inserting member through the ear. The installer of the third embodiment can be modified by providing the inserting member with either a female or male end.

In yet another embodiment, the ear tag installation tool may take advantage of handle members which each have resiliently biased ends which greatly assist in securing the ear tag to the animal's ear, as well as steadying the installation tool as it is operated to install the ear tag. With this embodiment, a disposable inserting member may be used which may fall away from the animal's ear after installation, or if sterility is not of particular concern, the inserting member may be permanently attached to the handle members.

Other advantages of this invention will become apparent from a review of the following description taken in conjunction with the accompanying drawings.

BEST MODE FOR CARRYING OUT THE INVENTION

Figures 1A, 1B, 1C:
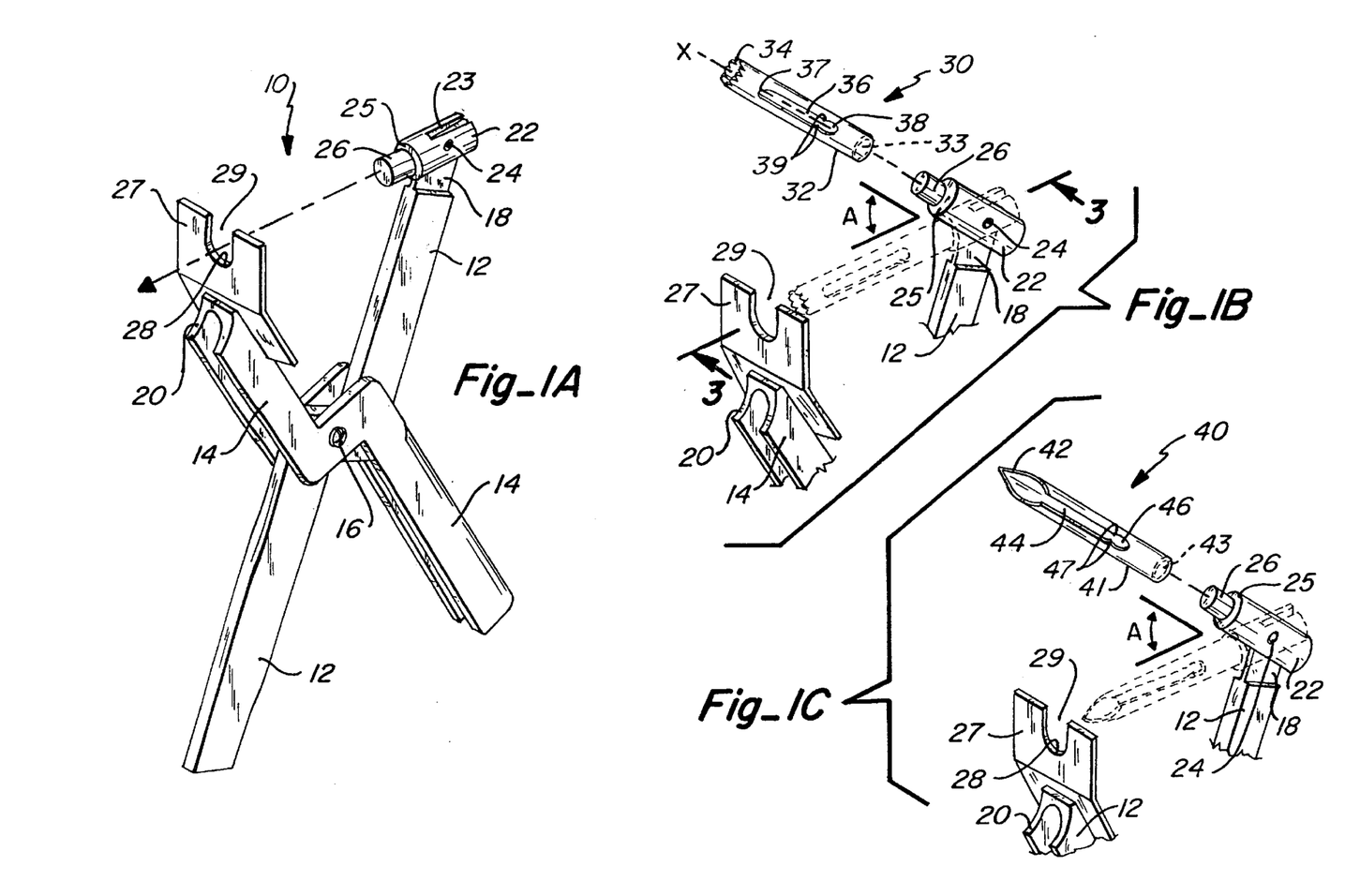
FIG. 1A is a perspective view of one preferred embodiment of the ear tag installation tool of this invention.
FIG. 1B is an enlarged fragmentary perspective exploded view of the tool of FIG. 1A and an inserting member adapted to removably connect to one of the handle members.
FIG. 1C is another enlarged fragmentary perspective exploded view similar to FIG. 1B illustrating another type of inserting member that may be used in conjunction with the installation tool.

An ear tag installation tool according to a first embodiment of this invention is illustrated in FIGS. 1A–1C. As shown, an ear tag installation tool 10 of the first embodiment is characterized by a first handle member 12 pivotally connected to a second handle member 14 by pin 16. Members 12 and 14 resemble a pair of scissors offset which can be moved between an open and closed position. The distal end 18 of the first handle member 12 includes a pivotal head 22 which is mounted to distal end 18 by pin 24. Head 22 has a groove 23 which is adapted to receive distal end 18 and which enables the head 22 to be pivoted or rotated about pin 24. The free end of head 22 has a smaller diameter portion shown as extension 26 and when placed in the position of FIG. 1A, extension 26 points toward the distal end 20 of second handle member 14. Preferably, a shoulder 25 is formed adjacent the extension 26, the shoulder serving a function as further outlined below. A base plate 27 is attached to the distal end 20 of the second handle member 14. Base plate 27 includes a receiving gap 29 which receives an inserting member 30 or 40 during the installation of an ear tag. The lower or bottom portion of receiving gap 29 defines a stop 28. The purpose of the inserting member is to secure a portion of the ear tag while the inserting member is forced through the tissue of the animal's ear. As shown in FIG. 1B, inserting member 30 is a tubular or cylindrical shaped structure having a body portion or side surface 32, a cutting tip or cutting element 34 formed at one end of the body portion, and an opening 33 formed at the other end of the body portion 30. An ear tag slot 36 is formed parallel to axis x—x of the inserting member 30 and in the side surface or body portion 32 thereof, the slot 36 being of a specified width which may receive the tab portion of an ear tag as further explained with reference to FIG. 2 below. Slot 36 may be described as having a distal end 37 which is adjacent to cutting tip 34, while the other end of slot 36 may include a neck receiving opening 38 whose width is adapted to receive the neck portion of an ear tag. One or more protrusions 39 define a point of separation between slot 36 and opening 38. Protrusions 39 delimit a narrower opening in body portion 32 that is contiguous with slot 36 and opening 38. When inserting member 30 is used to penetrate the ear of an animal, cutting tip 34 causes a circular shaped portion of the ear to be removed. This circular shaped tissue is often referred to as a "slug."

FIG. 1C illustrates the use of the installation tool 10 with modified inserting member 40. Inserting member 40 is also characterized by a tubular or cylindrical shaped body portion 41 which has a cutting tip 42 formed at one end, and an opening 43 formed at the other end. Cutting tip 42 creates a semi-circular shaped cut in the animal's ear. Body portion 41 further includes a tag slot 44 which may extend continuously toward the cutting tip 42. The other end of the tag slot 44 may include a neck receiving opening 46 and protrusions 47 in the same arrangement as neck receiving opening 38 and protrusions 39 of inserting member 30.

During the installation of an ear tag by penetration of inserting members 30 or 40 through the ear of an animal, the inserting member is first aligned with receiving gap 29. After the cutting tip of the inserting member has penetrated the ear, the inserting member is urged to rotate away from the base plate 27. This rotation angle A is illustrated in FIGS. 1B and 1C. The degree to which the inserting member rotates can be controlled by adjusting the lengths of distal ends 18 and 20. For example, distal end 18 can be shortened such that when the handle members are moved to a closed position, stop 28 prevents the inserting member from rotating at an angle opposite angle A. Alternatively, distal end 20 or base plate 27 can be lengthened with respect to distal end 18 so that the closing action of the handle members naturally cause the rotation of the inserting member. This rotation of the inserting member provides an increased capability for the tab portion of the ear tag to be separated from the inserting member as it is inserted through the animal's ear. Consequently, the insertion process is made more efficient.

Figures 2, 3, 4:
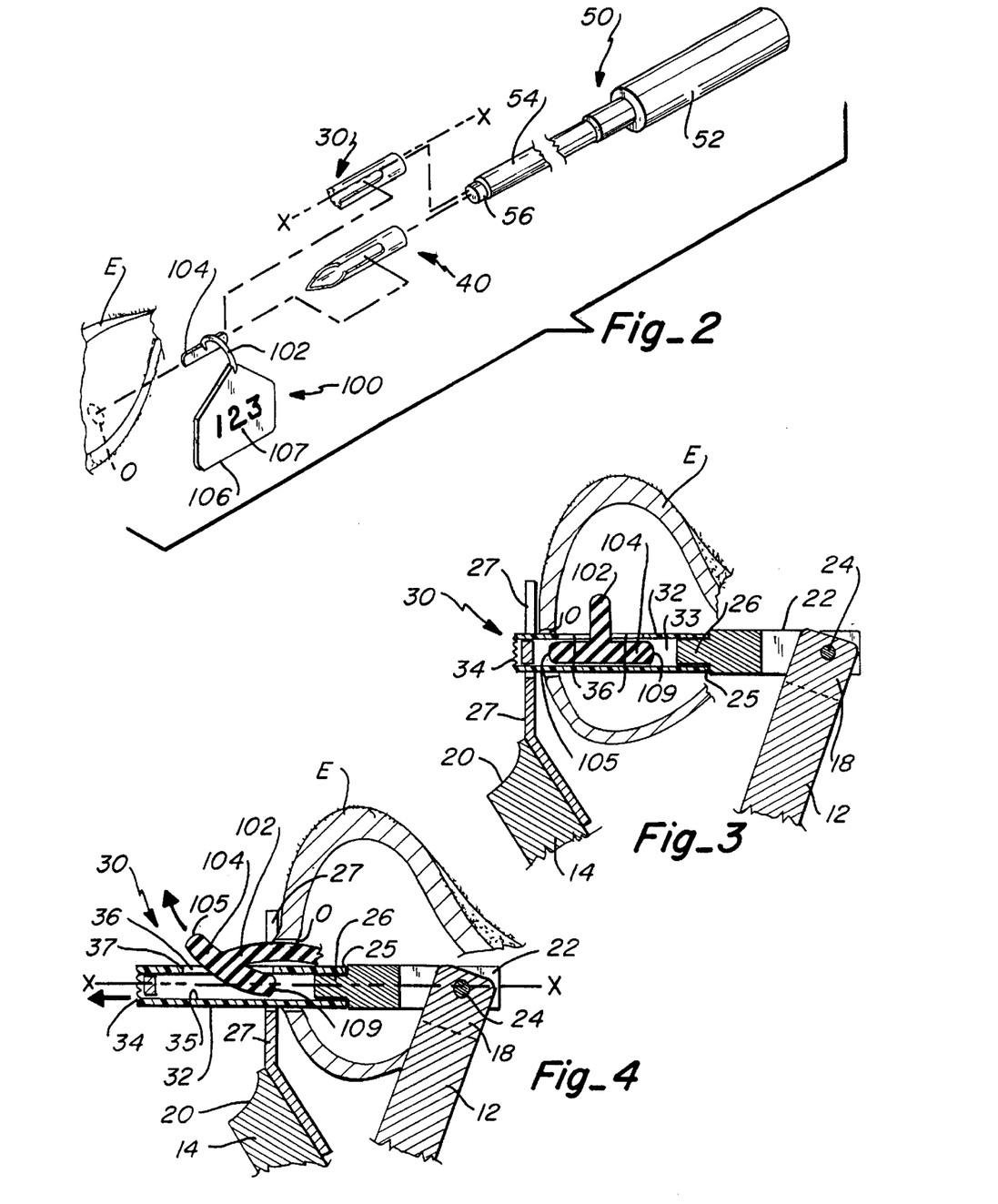
FIG. 2 is a fragmentary perspective exploded view of another embodiment of the ear tag installation tool of this invention illustrating its use with either of the inserting members illustrated in FIGS. 1B and 1C, and one type of ear tag which may used with the inserting members.
FIG. 3 is an enlarged fragmentary vertical section taken along line 3—3 of FIG. 1B illustrating installation of the ear tag.
FIGS. 4–7 are additional enlarged fragmentary vertical sections sequentially illustrating the installation of the ear tag.

FIG. 2 illustrates a second embodiment of the ear tag installation tool of this invention. For this embodiment, in lieu of a pair of handle members, the ear tag installation tool 50 may simply resemble a screw driver or punch type tool including a handle 52, a rod 54 extending from the handle 52, and an engaging portion 56 extending from rod 54. Engaging portion 56 is inserted within the opening 33/43 of the inserting member of choice. Also shown in FIG. 2 is one example of an ear tag which may be installed in the ear E of an animal by use of tools 10 or 50. The ear tag 100 has a curved neck portion 102 made of a resilient material which has a tendency to keep its curved shape. This curved shape defines a normal position for the neck portion. A tab portion or locking member 104 is connected to one end of the curved neck portion 102 while the panel 106 of the ear tag connects to the other end of the curved neck portion 102. Indicia 107 may be placed on the panel 106 in order to identify the animal. The tab portion or locking member 104 is inserted within the tag slot of the inserting member. The length of tab portion 104 is approximately the same or slightly exceeds the length of the tag slot of the inserting member.

Figures 5, 6:
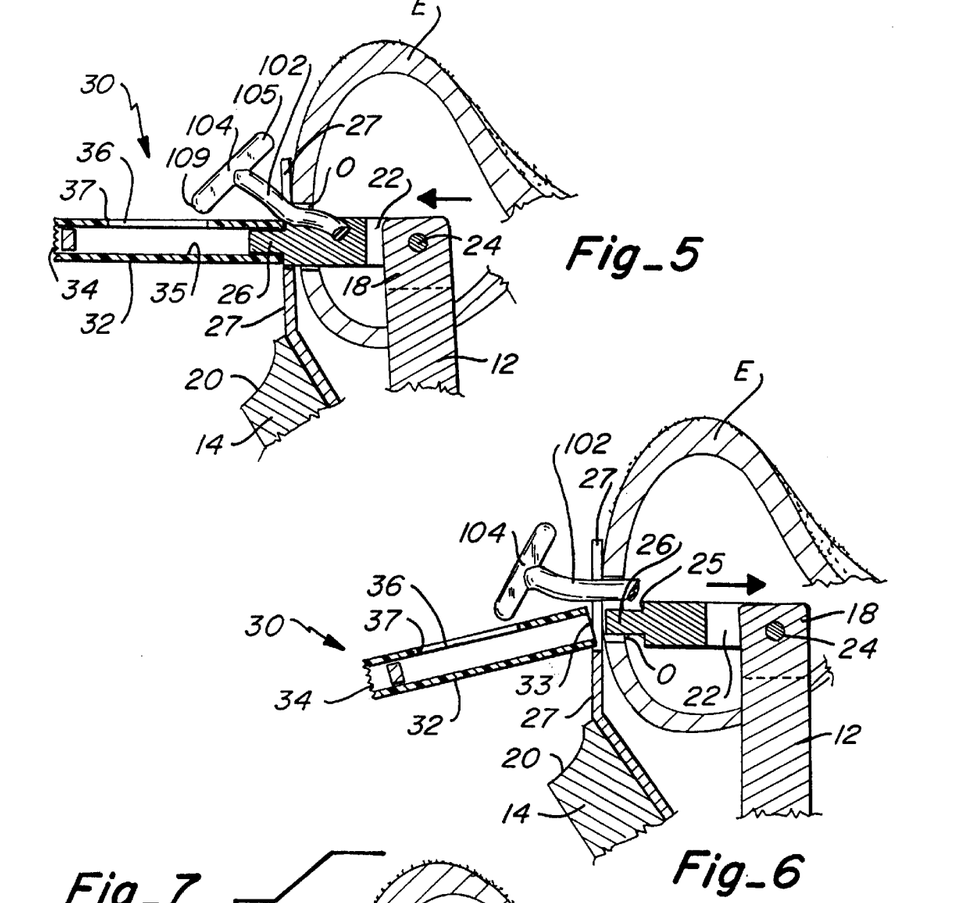

The installation of the ear tag 100 by tool 10 will now be explained with reference to FIGS. 3–7. As illustrated in FIG. 3, the handle members 12 and 14 are placed on opposite sides of the ear. Tab portion 104 is inserted within tag slot 36 of inserting member 30. Extension 26 of head 22 is then inserted within opening 33 of inserting member 30 which places inserting member 30 in a position to penetrate the ear. Shoulder 25 limits the extent to which extension 26 can be inserted within opening 33. The handle members are squeezed together first causing cutting tip 34 to penetrate the ear and to form opening O therein. As the handle members continue to be moved to the closed position, the inserting member continues its travel through the ear and neck portion 102 of the ear tag begins to make contact with the tissue of the ear surrounding opening O. This contact between the neck portion 102 and the ear causes the neck portion to be rotated approximately 90° from its normal position and substantially in a direction parallel with axis x—x. This deformation of the neck portion 102 causes the distal end 105 of tab portion 104 to rotate out of the tag slot 36 near the distal end 37. This rotation can be thought of as a stripping of the tab portion away from the inserting member. The proximal end 109 of the tab portion 104 becomes wedged against the interior surface 35 of inserting member 30 which further results in the distal end 105 to continue moving away from the tag slot as the inserting member further penetrates the ear. When the handle members reach the position illustrated in FIG. 5, the tab portion 104 has completely cleared the slot 36. As illustrated in FIG. 6, the handle members can then be moved to the open position which causes the inserting member 30 to fall away from the ear. Specifically, contact of the curved neck portion 102 against the inserting member 30 as the handle members are moved to the open position allows the extension 26 to be easily removed from within opening 33, and once extension 26 clears opening 33, inserting member 30 falls clear. Because of the size of the opening O, extension 26 does not make contact with the opening O, thus preventing contamination between animals. In order to ensure that no contact is made between extension 26 and the opening O, extension 26 can be made of a much smaller diameter than illustrated which gives the extension 26 a greater clearance between it and the opening O. Accordingly, opening 33 can also be modified to properly mate with a smaller diameter extension 26.

It is desirable to have at least some gap or space between the proximal end 109 of tab portion 104 and the tip of extension 26 so that the distal end 105 of the tab portion 104 does not become caught against the distal end 37 of the tag slot by pressure induced on the tab portion 104 by the extension 26. If the continuous tag slot 44 is used, it is still important to have some separation between extension 26 and proximal end 109 so that the extension 26 does not inadvertently influence the rotation of the tab portion 104 out of the tag slot.

Figure 7:
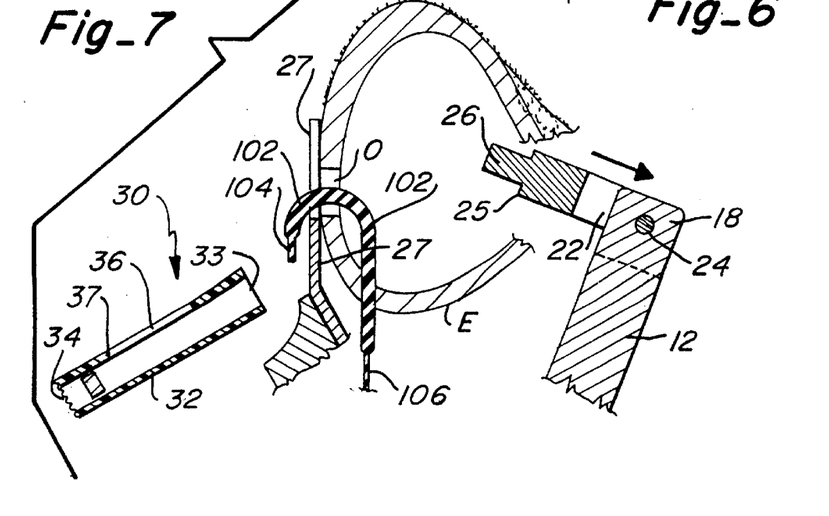

FIG. 7 shows the inserting member 30 falling completely clear of the ear E as the handle members have been further moved to the open position. Also, the neck portion 102 is no longer constrained within or against the inserting member 30 which allows the neck portion to return to its undeformed or normal position.

The ear tag installation tool 50 may be used to install an ear tag in the same manner as described above with reference to ear tag installation tool 10. The only significant difference in the method of installing an ear tag by use of the installation 50 is that a free hand of the user is used to stabilize the ear E as the inserting member is pushed through the ear. The same stripping action described above is achieved with respect to the tab portion of the ear tag and the inserting member. The inserting member 30 and the extension 26 can be coated with an appropriate antibiotic material which further reduces the chances of transmitted infections between animals. Additionally, the tag itself can be coated with an antibiotic material along the neck portion 102 and tab portion 104 to help prevent such contamination.

Figures 8, 9, 10, 11:
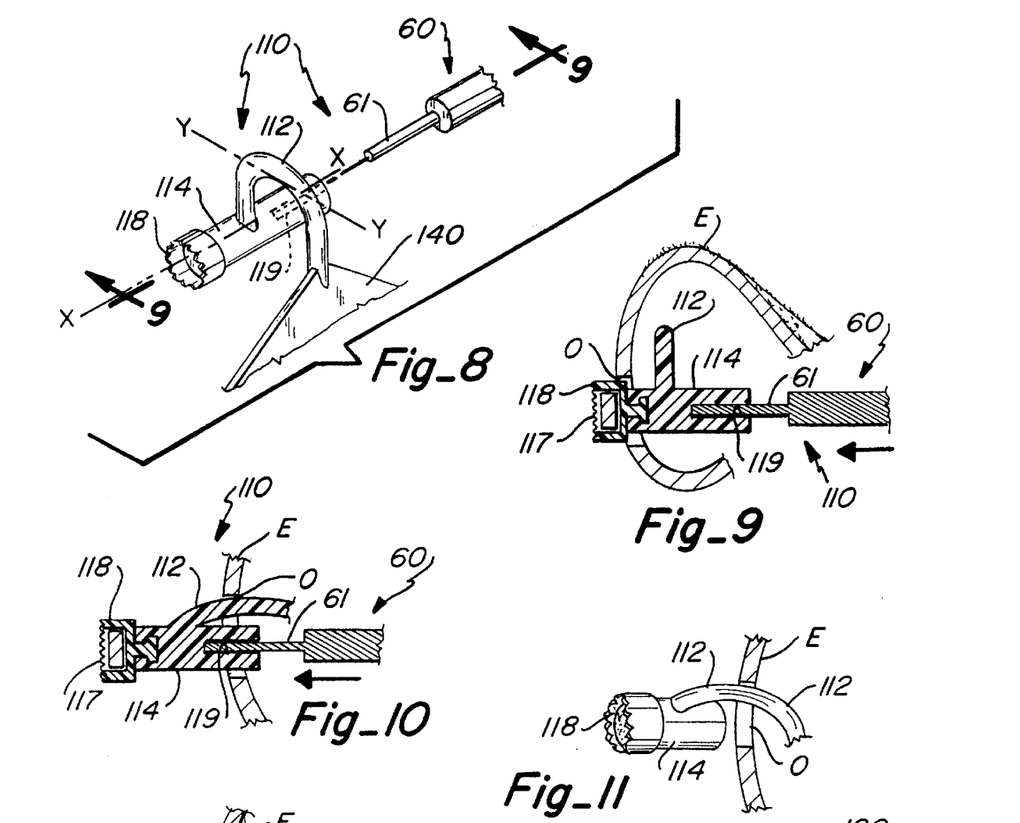
FIG. 8 is a perspective view of another form of the invention defined as an ear tag installer wherein the inserting member with cutting tip is directly attached to the neck portion of the ear tag.
FIGS. 9–12 sequentially illustrate the installation of an ear tag by the installer of FIG. 8.

According to another embodiment of this invention, the installer has some of its elements mounted directly to the ear tag and further includes a driving tool to assist in the placement of the ear tag. As shown in FIG. 8, the ear tag installer 110 includes neck portion 112 which connects at one end to inserting member 114, and connects at its other end to tag 140. Neck portion 112 extends along a plane which extends in the direction of axis y—y. Axis y—y is substantially perpendicular to axis x—x. Thus, in this embodiment of the invention, the ear tag 140 is solely defined as the same structure found in the panel 106 of tag 100, while the neck portion 112 and inserting member 114, although attached to the ear tag 140 are considered part of the installer 110. Inserting member 114 simply replaces the tab portion or locking member 104 of tag 100 and results in the inserting member 114 being permanently attached to the animal's ear after installation of the ear tag. The ear tag installer further includes a driving tool 60 having a driving tip 61 which engages with the well 119 of inserting member 114. Driving tool 60 can take the form of tool 50 or tool 10 or any other tool which can push the inserting member 114 through the ear. Inserting member 114 is structurally similar to inserting member 30. Specifically, one end of inserting member 114 includes a cutting tip 117 while the other end of the inserting member 114 has well 119 which receives driving tip 61. As further shown in FIGS. 9 and 10, the cutting tip 117 may be held within a cutting tip holder 118 which attaches to inserting member 114. Thus, various types of cutting tips 117 can be installed with the same inserting member.

Figure 12:
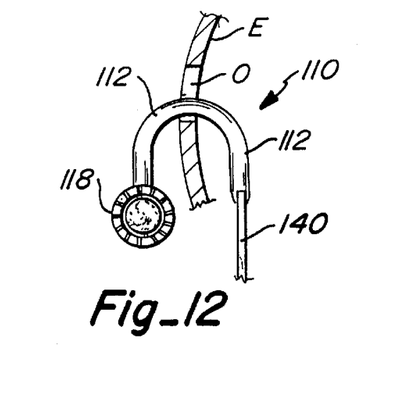

FIGS. 9–12 illustrate the method by which the inserting tool 60 pushes the inserting member 114 through the ear. FIG. 9 shows the inserting member penetrating the ear, FIG. 10 illustrates the deformation of neck 112, and FIG. 11 illustrates the neck portion beginning to return to its undeformed or normal position. The deformation of the neck portion 112 occurs in the same way as previously described with respect to the first and second embodiments. FIG. 12 shows neck portion 112 in its normal position causing the inserting member 114 to extend transversely with respect to opening O. The return of the neck portion to the normal or undeformed position ensures that the inserting member 114 cannot pass back through opening O and which results in the ear tag being securely fastened to the animal's ear. The resiliency or spring action of the neck portion causes it to snap back to its normal position as soon as the inserting member 114 clears the ear.

Figure 13:
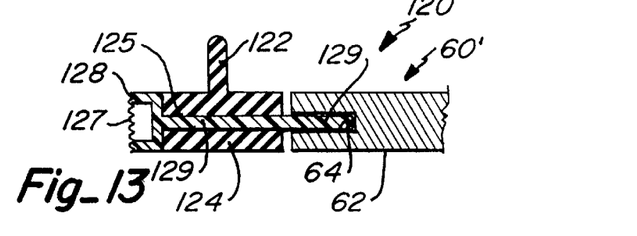
FIG. 13A is a fragmentary vertical section taken along line 9—9 of FIG. 8 illustrating one modification of the installer.

FIG. 13 is an alternative embodiment of an ear tag installer illustrated as installer 120. Installer 120 is similar to installer 110. Installer 120 includes an inserting member 124 which penetrates the ear of an animal by means of a cutting tip 127 retained in a cutting tip holder 128 attached to one end of the inserting member 124. A neck portion 122 extends in a perpendicular fashion away from the longitudinal axis of the inserting member 124. A central opening 125 is formed completely through the inserting member 124. A shaft 129 attaches to the cutting tip holder 128 and extends through opening 125 and protrudes outwardly from the opening 125. An alternate driving tool 60' is designed to engage with the protruding end of shaft 129, driving tool 60' having a distal end with a well or recess 64 formed therein. The installer of FIG. 13 functions in the same manner as the installer of 110, the only significant difference being that the driving tool 60' has a female-type end as opposed as a male-type end.

Figure 14:
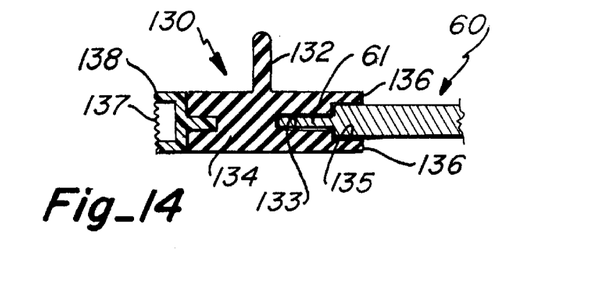
FIG. 14 is a fragmentary vertical section as in FIG. 13 illustrating another modification of the installer of FIG. 8.

FIG. 14 is yet another alternative ear tag installer shown in the form of installer 130 which is also similar to installer 110. Specifically, installer 130 includes an inserting member 134 having a cutting tip 137 and cutting holder 138 positioned at one end, and one or more contiguous wells or openings 133 and 135 formed at the other end. As with the previous embodiments, neck 132 extends perpendicularly away from the longitudinal axis of the inserting member 134. According to this arrangement, installer 130 is adapted to use driving tool 60. When the driving tip 61 of tool 60 is engaged with the inserting member 134, the tool 60 is further enclosed within additional well or opening 135 defined by cylindrical extension or flange 136 which extends from the proximal end of member 134. One advantage of using an installer according to FIG. 14 is that the driving tool 50 is further shielded from contact with the animal's ear which further prevents contamination between animals.

Although FIGS. 8–14 illustrate structure which has been described as an ear tag installer combination, the combination of the inserting member attached directly to the neck portion can also be defined simply as a modified ear tag with integral installation capability. Therefore, it will be understood that the installer structure directly attached to the ear tag in FIG. 8 constitutes a separate embodiment.

In the embodiments discussed above, the portion of the ear tag installation tool or driving tool which pushes the inserting member through the ear can also be defined as an engaging member. Additionally, the neck portions 102, 112, 122 or 132 can be alternately defined as resilient members.

Another embodiment of the ear tag installation tool of this invention is illustrated in FIGS. 15A–D. This embodiment is very similar to the first preferred embodiment illustrated in FIG. 1A; however, the distal ends of the handle members are modified to provide additional advantages. As with the first embodiment, an ear tag installation tool 200 includes a pair of handle members, namely, first handle member 202 and second handle member 204. These handle members are pivotally connected by pin 206. A spring 208 may traverse between the handle members in order to place them in a normally open position, and to provide a biasing force as the handle members are moved to a closed position. As shown, the center coiled portion of the spring 208 may rest on pin 206, and the free ends of spring 208 may extend along the proximal ends of the handle members.

Figures 15A, 15B:
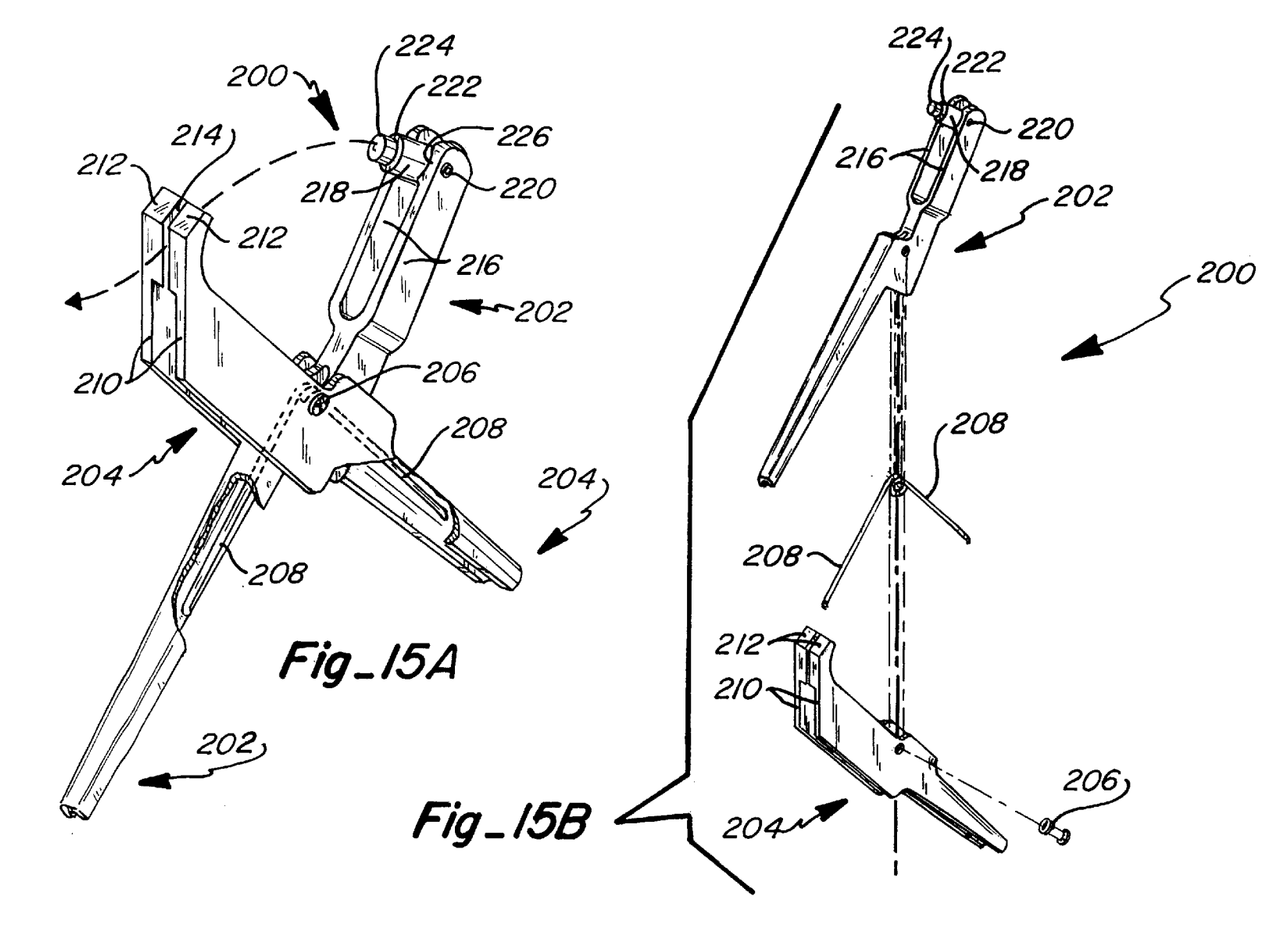
FIG. 15A is a fragmentary perspective view of another preferred embodiment of the ear tag installation tool of this invention.
FIG. 15B is an exploded perspective view of the embodiment of FIG. 15A further illustrating each of the major components.
Figures 15C, 15D:
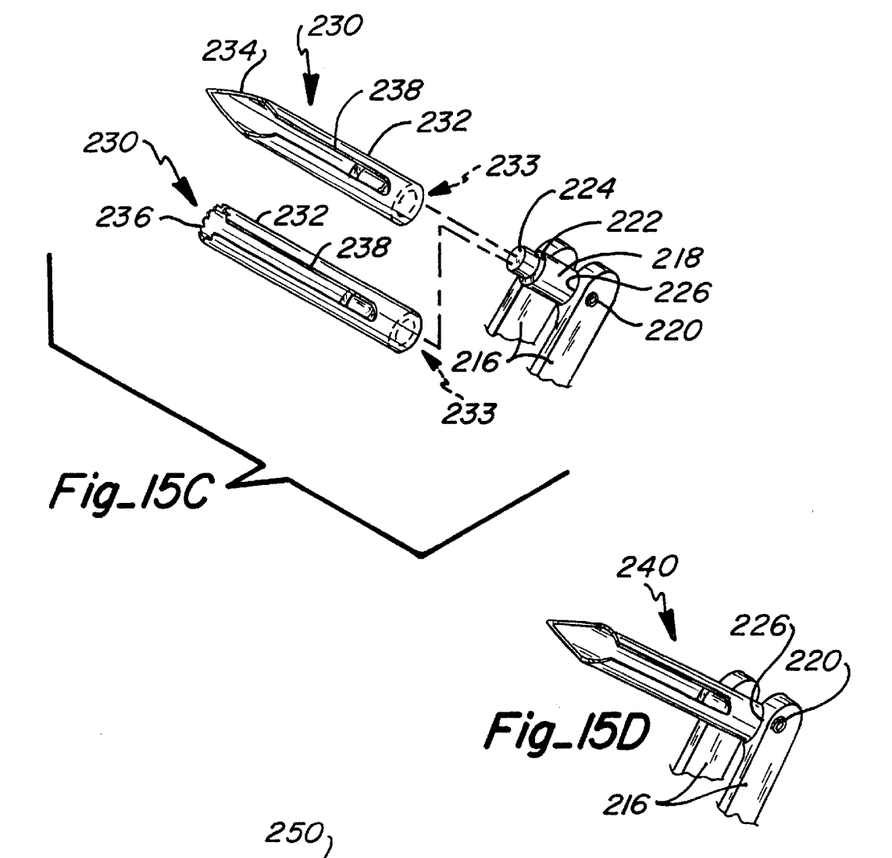
FIG. 15C is an enlarged fragmentary perspective view of a portion of the embodiment of FIG. 15A.
FIG. 15D is another enlarged fragmentary perspective view of the embodiment of FIG. 15A which may incorporate a permanently attached inserting member.
Figure 26:
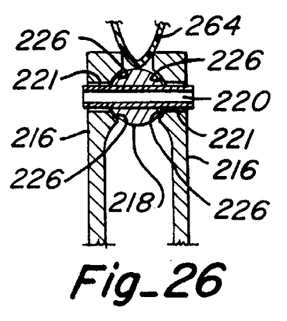
FIG. 26 is a vertical section taken along line 26—26 of FIG. 18 illustrating the support extensions which surround and secure the inserting member.
Figure 27:
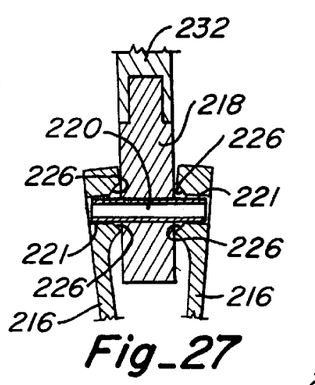
FIG. 27 is a section taken along line 27—27 of FIG. 20 illustrating the inserting member being rotated when the handle members are in the closed position resulting in the support extensions being spread apart.

The distal end of the first handle member 202 may include a pair of spaced support extensions 216. An inserting head 218 is mounted at the free or distal ends of the support extensions 216 by pin 220. Inserting head 218 may include a head extension 224 having a smaller cross sectional area or diameter resulting in the formation of shoulder 222. As best seen in FIG. 15C and FIGS. 26 and 27, support extensions 216 include curved or crescent shaped slots 226 formed on their inner opposed surfaces which conform to the shape of inserting head 218. Pin 220 is rigidly mounted within inserting head 218. However, pin 220 may freely slide within channels 221 formed through support extensions 216, as best seen in FIGS. 26 and 27. The need for pin 220 to be able to slide within channels 221 is further discussed below.

Second handle member 204 includes a pair of receiving prongs 210 formed at the distal end thereof Receiving prongs 210 have a pair of corresponding prong extensions 212 which extend from the receiving prongs 210. Prong extensions 212 are spaced from one another at a desired distance forming a gap 214.

An inserting member 230 is removably connected to inserting head 218 by inserting head extension 224 in the opening 233 formed at the proximal or trailing end of inserting member 230. The prong extensions 212 are in a normal position prior to contact with the inserting member 230. The inserting member 230 may be more specifically defined as including a cylindrical body portion 232 with a cutting tip 234 formed at the distal end thereof A longitudinal slot 238 is formed in body portion 232 in order to receive a portion of the ear tag as discussed further below.

As shown in FIG. 15D, if sterility is not of particular concern, the inserting head 218 and the inserting member 230 may be formed as one integral part shown as head/inserting member 240. Head/inserting member 240 remains permanently attached to the installation tool during operation.

Figure 16:
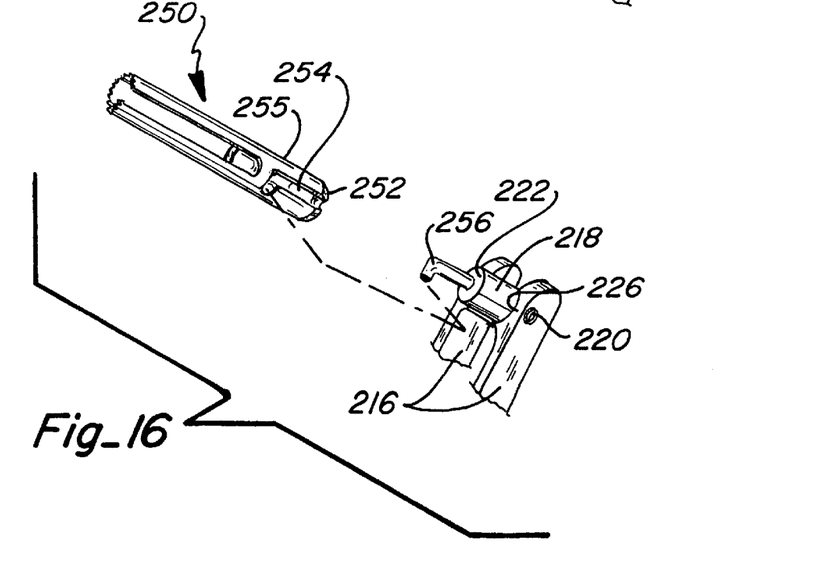
FIG. 16 is another enlarged fragmentary perspective view of the embodiment of FIG. 15A illustrating this embodiment incorporating a modified pin extension of the head which engages a modified inserting member.

FIG. 16 illustrates another modified inserting member 250 which may include a chamfered proximal edge 252. This chamfered edge 252 assists in stripping the inserting member 250 away from the installation tool during operation, as also further discussed below. Inserting member 250 has a solid proximal portion 255 and an L-shaped slot or groove 254 formed thereon. Thus, this inserting member 250 has no proximal opening like opening 233 in inserting member 230. Accordingly, the inserting head 218 may include an L-shaped head extension 256 which is received in the L-shaped slot 254. Slot 254 and modified head extension 256 allow mounting of the inserting member 250 to the inserting head 218 in a sideways or transverse fashion as opposed to mounting achieved by axially aligning the inserting member with the inserting head. Additionally, the slot 254 and head extension 256 allow the inserting member 250 to remain attached during installation of the ear tag because the extension 256 remains trapped in slot 254; however, the inserting member may still be replaced as needed.

Figures 17, 18, 19:
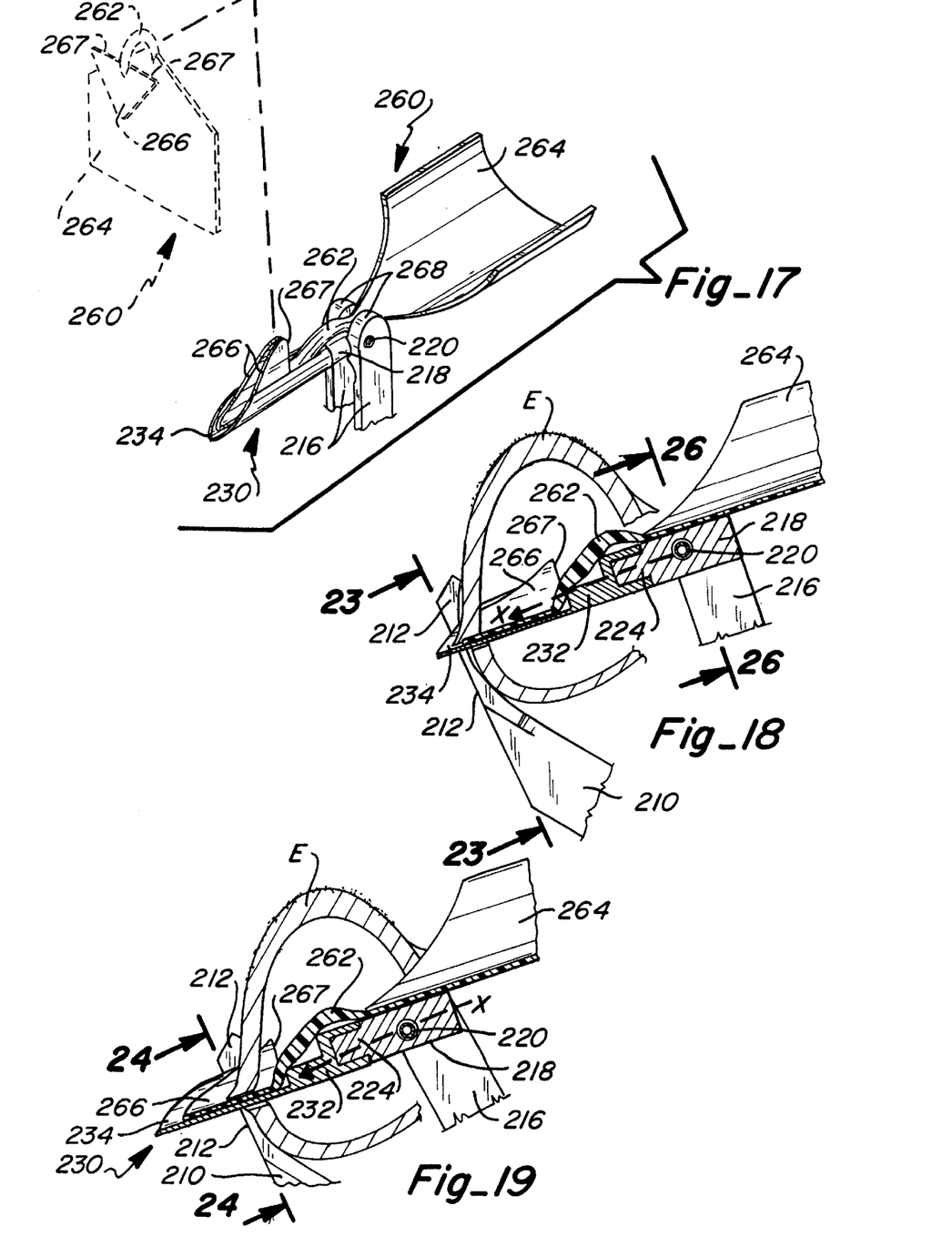
FIG. 17 is an enlarged fragmentary perspective view of the embodiment of FIG. 15A illustrating an ear tag mounted thereto.
FIG. 18 is a fragmentary vertical section, taken along line 18—18 of FIG. 15A illustrating an ear tag mounted to the ear tag installation tool and further illustrating the tool installing the ear tag as the inserting member begins to penetrate the animal's ear.
FIG. 19 is another fragmentary vertical section further illustrating the inserting member continuing to penetrate the animal's ear as the handle members are moved toward the closed position.

As shown in FIG. 17, the ear tag installation tool 200 may be used to install an arrowhead-type ear tag 260. This particular type of ear tag 260 is characterized as having a curved and resilient neck 262 which interconnects a panel 264 and an arrowhead 266. The arrowhead 266 has a trailing edge 267 which has an important function when the ear tag is installed as further discussed below.

The operation of the ear tag installation tool 200 will now be explained when using inserting member 230. As shown in FIG. 17, arrowhead 266 is folded and placed within slot 238. Neck 262 is straightened so that it extends between the free distal ends 268 of support extensions 216 that extend above inserting head 218. The mounting of the ear tag in this manner helps keep it aligned during installation.

Figure 23:
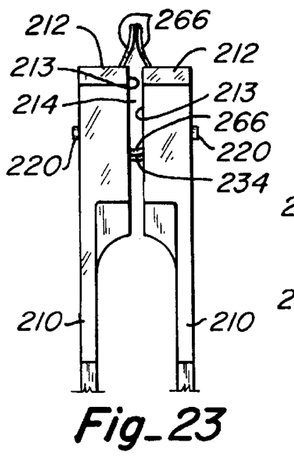
FIG. 23 is an enlarged vertical section taken line 23—23 of FIG. 18 showing the prong extensions in relation to the inserting member just as the inserting member begins to pass through the prong extensions.
Figure 24:
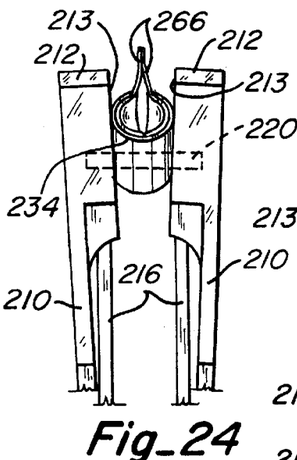
FIG. 24 is an enlarged vertical section taken along line 24—24 of FIG. 19 illustrating the prong extensions being spread apart as the inserting member is passed between the prong extensions.
Figure 25:
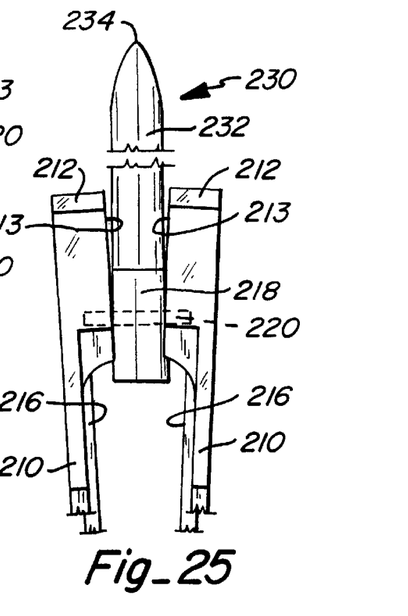
FIG. 25 is an enlarged vertical section taken along line 25—25 of FIG. 20 illustrating the prong extensions being fully spread apart and further illustrating the inserting member being rotated when the handle members are placed in the closed position.

As shown in FIG. 18, as the handle members are squeezed together, cutting tip 234 begins to penetrate the ear E. As shown in FIG. 19, as the handle members continue to be moved to the closed position, inserting member 230 continues to penetrate the ear and move between prong extensions 212. Prong extensions 212 are forced apart because the cross sectional area of inserting member 230 is larger than the gap 214. FIGS. 23 and 24 also show how prong extensions 212 are forced apart by the movement of inserting member 230. The inner opposed surfaces 213 of prong extensions 212 exert a biasing force against the opposed exterior sides of inserting member 230. The contact between the inner opposed surfaces 213 of prong extensions 212 and inserting member 230 helps to stabilize the inserting member as it inserted through the ear, and also helps to stabilize the portion of the ear that is being pierced by the inserting member. Because of the contact between the inner opposed surfaces 213 of prong extensions 212 and the exterior sides of inserting member 230, the tissue of the ear is kept taut which allows the inserting member to penetrate the ear with minimal slippage and tension force on the ear which, therefore, minimizes tissue damage.

Figure 20:
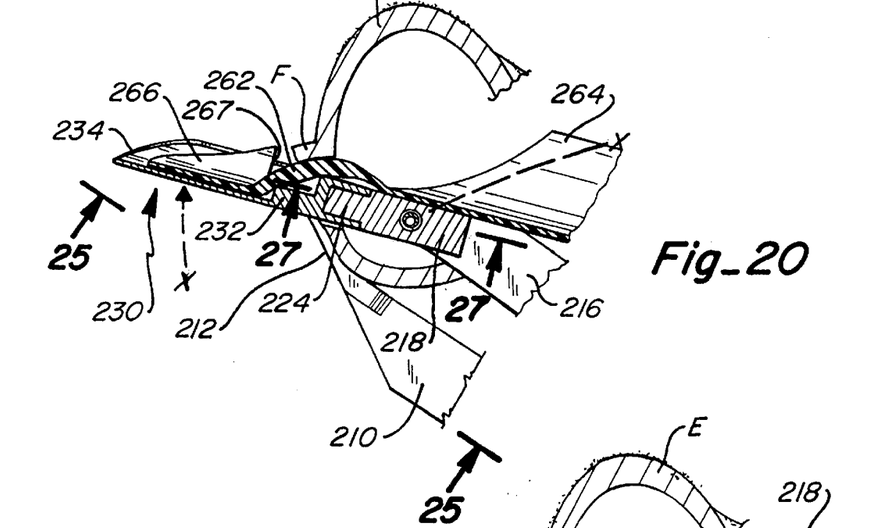
FIG. 20 is another fragmentary vertical section illustrating the handle members being moved to the closed position.
Figures 21, 22:
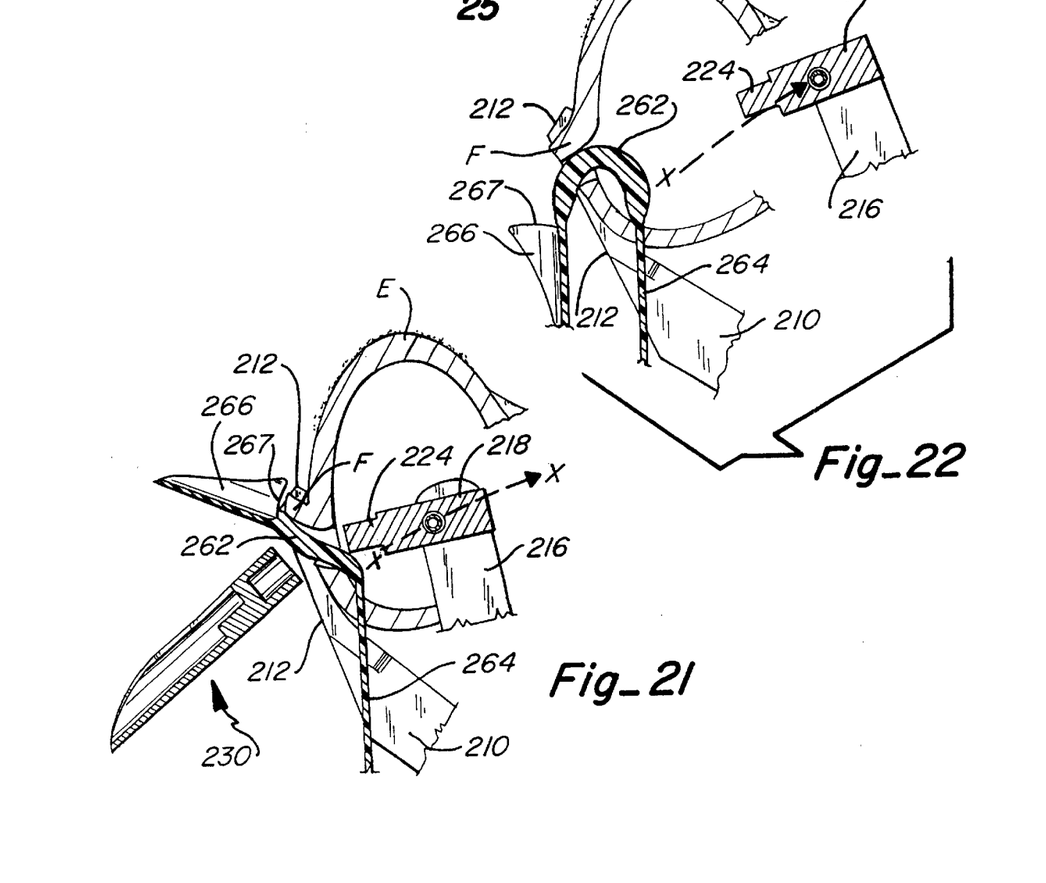
FIG. 21 is another fragmentary vertical section illustrating the handle members being moved back toward the open position causing the inserting member to be stripped away from the ear tag and resulting in one portion of the ear tag positioned on one side of the ear, and the remaining portions of the ear tag being positioned on the other side of the ear.
FIG. 22 is yet another fragmentary vertical section which illustrates the handle members as they are further moved toward the open position and showing the ear tag as it appears after installation.

As the handle members are moved to the closed position, as shown in FIG. 20, the inserting member 230 is rotated about pin 220 so that the cutting tip 230 extends in the direction of the closed handle members. At this point, the inserting member 230 has been inserted to its fullest extent through the ear resulting in a flap of ear tissue F being formed. Once the trailing edge 267 of arrowhead 266 clears the opposite side of the ear E, the handle members may be released which causes them to move back toward the open position due to the biasing force of spring 208. As shown in FIG. 21, trailing edge 267 contacts the opposite side of the ear E at or near flap F which assists in stripping the inserting member 230 away from inserting head 218. Additionally, because the inner opposed surfaces 213 of prong extensions 212 maintain contact with the inserting member 230, this also helps allow the inserting head 218 to be separated from the inserting member 230 as the handle members move back to the open position. Once separation between head 218 and inserting member 230 has occurred, inserting member 230 falls freely away from the ear and the installation tool.

FIG. 22 shows the tag 260 as the resilient neck 262 is no longer stressed by its engagement with the installation tool, which allows the arrowhead 266 to rotate back to its normal position. At this point, the installation tool may simply be pulled away from the ear.

Figure 28:
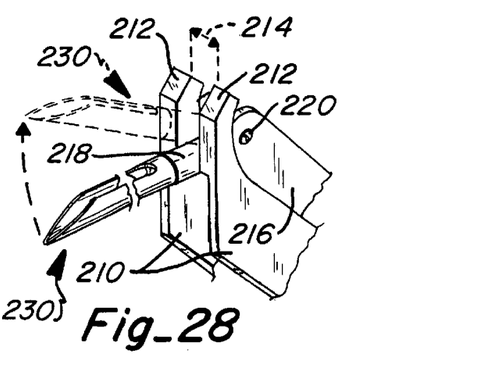
FIG. 28 is a enlarged fragmentary perspective view showing the handle members in the closed position resulting in the inserting member being rotated.

One important aspect of this particular embodiment is the way in which the inserting head 218 dislocates from its normal position with respect to the surrounding support extensions 216. As seen in FIG. 26, prior to and when the inserting member 230 initially makes contact with the ear E, inserting head 218 resides in the conforming opening formed by slots 226 of support extensions 216. This position of the inserting member 230 within support extensions 216 ensures that the inserting member 230 will not undesirably rotate or otherwise move as the inserting member begins to cut the ear tissue. Once the cut has begun to be made within the ear tissue, the inserting head with attached inserting member is allowed to rotate. This rotation results in the inserting member sliding distally along the inner opposed surfaces 213 of the prong extensions 212. Without the inserting head being able to rotate, this would force the inserting member to maintain a straighter path through the prong extensions which would also cause them to be spread further apart because the inserting member would otherwise slide more in a proximal direction. Thus, the above-identified advantages of having biased prong extensions is maintained without requiring the user of the tool to use excessive force in order to move the handle members to the closed position which might otherwise occur if the inserting head was not allowed at least some rotational capability. In accordance with this rotational capability, as mentioned above, pin 220 is rigidly affixed to inserting head 218; however, pin 220 is allowed to freely slide within the channels 221 which allows the dislocation of the inserting head 218 out of slots 226, as best seen in FIG. 227. FIG. 28 also illustrates this rotation of the inserting head 218 as the handle members are moved toward the closed position.

If the inserting member includes chamfered edges 252, as shown in FIG. 16, these chamfered edges also assist in stripping the inserting member away from the inserting head. More specifically, when the ear tag installation tool reaches the stage shown in FIG. 20, the chamfered edges 252 will have cleared the exterior side of the prong extensions 212. As the handle members are moved back to the open position, the resiliently biased prong extensions will have moved back toward one another in their normal position and which, therefore, causes the bevel in the chamfered edges to serve as a stop preventing the inserting member from being pulled back through the prong extensions. This chamfered edge may be particularly useful when the arrowhead-type ear tag has a longer neck which will not allow the trailing edge 267 to contact the opposed side of the ear until the handle members are moved to a more open position. Accordingly, the chamfered edges themselves can initially serve to strip the inserting member from the inserting head.

Figure 29:
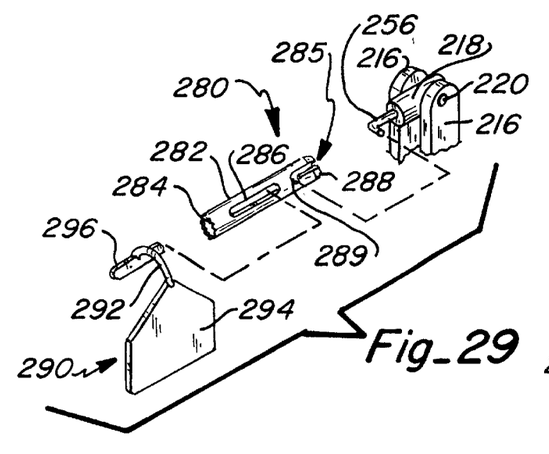
FIG. 29 is a fragmentary exploded perspective view of a modified inserting member, and an ear tag as previously illustrated in FIG. 2, which may be used with the ear tag installation tool of FIG. 16.

FIG. 29 illustrates another type of ear tag which may be installed with the ear tag installation tool of FIGS. 15 and 16. This ear tag 290 is the same as the ear tag illustrated in FIG. 2, and is characterized by a curved neck portion 292 which interconnects a base or panel 294 and a transverse tab or locking member 296. When using this type of ear tag 290, it is advantageous to use a modified inserting member 280. This inserting member 280 has a body portion 282 with a closed ended slot 286 formed thereon. A cutting tip 284 is formed at distal end, and an opening 285 for receiving the inserting head 218 is formed at the proximal end. Optionally, as discussed with reference to FIG. 16, the inserting member 280 may also include a chamfered edge 288 and an additional slot 289 to receive modified head extension 256.

Figure 30:
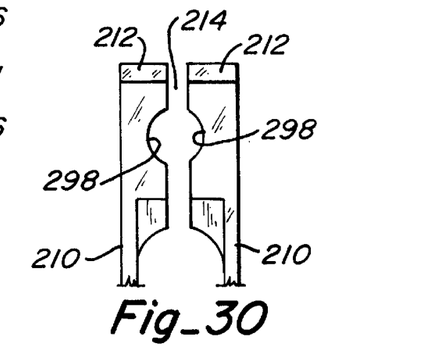
FIG. 30 is another enlarged vertical section, similar to the enlarged vertical section of FIG. 23, illustrating a modification to the prong extensions in the form of curved or crescent shaped slots formed on the inner opposed surfaces of the prong extensions.

As shown in FIG. 30, the prong extensions 212 may be modified to include curved or crescent shaped slots 298 formed on their inner opposed surfaces. The purpose of these slots 298 is to reduce the amount of hand pressure necessary to move the handle members toward the closed position since the slots conform to the shape of the inserting member placed therethrough which does not require the prong extensions to be separated so far apart. Also, the increased surface area in contact between the inserting member and the inner surfaces of the prong extensions allows the inserting member to be stripped away from the inserting head as the handle members move back to the open position. Additionally, slots 298 can be shaped to allow the inserting head 218 to rotate. The more pronounced slots 298 are, the more hand force is needed to cause inserting head 218 to slide distally between the inner surfaces of the prong extensions because the inserting head will have a tendency to remain in the slots 298.

The operation of tool 200 is the same as described above when using inserting members 240 and 250 with the exception that these inserting members remain attached to the tool during tag installation. As set forth above, inserting member 250 may be replaced when the tool is not being used by simply removing extension 256 from L-shaped slot 254.

This invention has been described in detail with reference to particular embodiments thereof, but it will be understood that various other modifications can be effected within the spirit and scope of this invention.

What is claimed is:

1. An ear tag tool for installing an ear tag on an ear of an animal, said tool comprising:

a first handle member having proximal and distal ends, said distal end including a pair of separable prong extensions extending to said distal end, said prong extensions having inner opposed surfaces separated by a gap continuously therebetween, said gap being of a desired width when said separable prong extensions are in a normal position;

a second handle member having proximal and distal ends, and pivotally connected to said first handle member so that said handle members are movable between an open position in which said distal ends are spaced apart and a closed position in which said distal ends are adjacent each other;

a head pivotally connected to said distal end of said second handle member;

an inserting member having a distal cutting end, and a proximal end connected to said head, said inserting member having a first longitudinal slot formed thereon to receive a portion of the ear tag during installation, said inserting member further having a cross sectional width which is greater than said width of said gap; and wherein the tag is installed on the ear by inserting a portion of the ear tag in said slot, positioning the ear between said distal ends of said handle members while in the open position, moving said handle members to the closed position so that said inserting member is inserted through said gap and in contact with said inner opposed surfaces of said prong extensions to spread said prong extensions apart from said normal position, and said prong extensions moving back toward one another to said normal position when said handle members are moved back to the open position.

2. A tool, as claimed in claim 1, wherein:

said head further includes a head extension extending therefrom; and said inserting member includes a second slot sized to receive said head extension.

3. A tool, as claimed in claim 1, further including:

a spring member traversing between said first and second handle members for urging said handle members to the open position, and providing a resilient force against said handle member when they are moved to the closed position.

4. A tool, as claimed in claim 1, wherein:

said proximal end of said inserting member includes a chamfered edge.

5. A tool, as claimed in claim 1, wherein:

said inner opposed surfaces of said prong extensions each include slots formed thereon which conform in shape to said inserting member when inserted therethrough.

6. A tool, as claimed in claim 1, wherein:

said inserting member is cylindrical shaped.

7. An ear tag tool for installing an ear tag on an ear of an animal, said tool comprising:

a first handle member having proximal and distal ends, said distal end including a pair of separable prong extensions extending to said distal end and separated by a gap therebetween, said first gap being of a desired width;

a second handle member having proximal and distal ends, said distal end including a pair of spaced support extensions extending to said distal end, said second handle member being pivotally connected to said first handle member so that said handle members are movable between an open position in which said distal ends are spaced apart and a closed position in which said distal ends are adjacent each other, said support extensions having inner opposed surfaces with curved slots formed thereon;

a head pivotally connected to said distal end of said second handle member and positioned in a second gap formed by said spaced support extensions and said curved slots; and an inserting member having a distal cutting end, and a proximal end connected to said head, said inserting member having a first longitudinal slot formed thereon to receive a portion of the ear tag during installation, said inserting member further having a cross sectional width which is greater than said first gap and insertable therethrough by separating said prong extensions.

8. A tool, as claimed in claim 7, wherein:

said head further includes a head extension extending therefrom; and said inserting member includes a second slot sized to receive said head extension.

9. A tool, as claimed in claim 7, further including:

a spring member traversing between said first and second handle members for urging said handle members to the open position, and providing a resilient force against said handle member when they are moved to the closed position.

10. A tool, as claimed in claim 7, wherein:

said proximal end of said inserting member includes a chamfered edge.

11. A tool, as claimed in claim 7, wherein:

said inner opposed surfaces of said prong extensions each include curved slots formed thereon which conform in shape to said inserting member when inserted therethrough.

12. An ear tag tool for installing an ear tag on an ear of an animal, said tool comprising:

a first handle member having proximal and distal ends;

a second handle member having proximal and distal ends, and pivotally connected to said first handle member so that said handle members are movable between an open position and a closed position;

a head pivotally connected to said distal end of said second handle member;

an inserting member having a distal cutting end, and a proximal end connected to said head, said inserting member being adapted to receive a portion of the ear tag during installation;

said first handle member having first resilient means formed at said distal end thereof for receiving said inserting member therethrough, said first resilient means being spread apart in response to said inserting member being inserted therethrough during installation of the ear tag; and said second handle member including second resilient means at said second end thereof and being spread apart in response to pivoting of said head as said inserting member is inserted through said first resilient means.

13. A method of installing an ear tag onto the ear of an animal, said method comprising the steps of:

providing a pair of handle members having first and second distal ends movable between an open position in which the distal ends are spaced apart and a closed position in which said distal ends are adjacent each other;

attaching an inserting member to the first distal end of the pair of handle members;

connecting a portion of the ear tag to the inserting member;

positioning the handle members in the open position with the first distal end on one side of the ear and the second distal end on the other side of the ear;

moving the handle members toward the closed position so that the inserting member is inserted through resiliently biased prong extensions on the second distal end of the pair of handle members;

spreading the resiliently biased prong extensions apart as the handle members are moved to the closed position so that the inserting member penetrates the ear and results in the portion of the ear tag attached to the inserting member being passed through an opening cut in the ear; and stripping the portion of the ear tag away from the inserting member after the portion of the ear tag passes through the opening cut through the ear.

14. A method, as claimed in claim 13, further comprising the step of:

releasing the inserting member from the handle members after said stripping step.

15. A method, as claimed in claim 13, further comprising the step of:

pivoting the inserting member as it is inserted through the resiliently biased prong extensions.

16. A method, as claimed in claim 13, further comprising the step of:

spreading resiliently biased support extensions located at the first distal end of the pair of handle members in response to the inserting member as it is inserted through the prong extensions.

* * * * *